(12) United States Patent
Hanada et al.

(10) Patent No.: US 8,122,083 B2
(45) Date of Patent: Feb. 21, 2012

(54) CLIENT APPARATUS

(75) Inventors: Takehiko Hanada, Tokyo (JP); Shin Miura, Tokyo (JP); Shigeru Imai, Tokyo (JP); Shinji Akatsu, Tokyo (JP); Yukimasa Sugino, Tokyo (JP); Masami Matsubara, Tokyo (JP); Susumu Oka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1073 days.

(21) Appl. No.: 11/920,535

(22) PCT Filed: Jun. 30, 2005

(86) PCT No.: PCT/JP2005/012121
§ 371 (c)(1),
(2), (4) Date: Nov. 16, 2007

(87) PCT Pub. No.: WO2007/004268
PCT Pub. Date: Jan. 11, 2007

(65) Prior Publication Data
US 2009/0106351 A1    Apr. 23, 2009

(51) Int. Cl.
*G06F 15/16* (2006.01)
(52) U.S. Cl. ......... 709/203; 709/217; 709/219; 709/223
(58) Field of Classification Search .......... 709/203, 709/217, 219, 223, 224
See application file for complete search history.

(56) References Cited

U.S. PATENT DOCUMENTS

| | | | | |
|---|---|---|---|---|
| 2003/0212804 A1* | 11/2003 | Hashemi | ...... | 709/228 |
| 2006/0041596 A1* | 2/2006 | Stirbu et al. | ...... | 707/200 |
| 2006/0161635 A1* | 7/2006 | Lamkin et al. | ...... | 709/217 |
| 2006/0259982 A1* | 11/2006 | Upendran | ...... | 726/27 |
| 2007/0055650 A1* | 3/2007 | Duncan et al. | ...... | 707/3 |

FOREIGN PATENT DOCUMENTS

| | | | |
|---|---|---|---|
| JP | 2001-282404 A | 10/2001 | |
| JP | 2004-348455 A | 12/2004 | |

OTHER PUBLICATIONS

JP 2004-3484455, "Information Processor, Information Processing Method and Computer Program", Yoshikawa et al.*

* cited by examiner

*Primary Examiner* — Lashonda Jacobs
(74) *Attorney, Agent, or Firm* — Birch, Stewart, Kolasch & Birch, LLP

(57) ABSTRACT

A client apparatus in accordance with the present invention includes a contents list request transmitting means 401 for transmitting a request of a media server apparatus 101 to transmit a contents list which is a list of metadata of contents, a contents list receiving means 402 for receiving the contents list from the media server apparatus 101, an item list storing means 403 for storing the contents list and an item list having listed items each of which is described as metadata, an item list transmitting means 404 for transmitting the item list to a monitor server apparatus 102, a key input means 405 for receiving a key input, an input key transmitting means 406 for transmitting the key input to the monitor server apparatus 102, and an identification information receiving means 407 for receiving identification information making it possible to uniquely identify each item included in the item list.

13 Claims, 16 Drawing Sheets

CLIENT APPARATUS

FIELD OF THE INVENTION

The present invention relates to a client apparatus which receives a user's input to a server apparatus connected to a network.

BACKGROUND OF THE INVENTION

As network technology has diffused into widespread practice in recent years, an idea, which is called home network, of connecting domestic PCs (Personal Computers) and home appliances with one another via a network has been come up with, and utilization of a network which is closed in a private home, such as a playback of contents like a video, a photo, or a piece of music which is stored in a PC using playback equipment which is a home appliance, is made.

UPnP AV (Universal Plug and Play AV) is used as a system for storage and playback of contents in a network, in which playback equipment plays back contents which it has acquired from a server apparatus (e.g., a hard disk recorder or a PC) which stores contents and provides contents to another apparatus. In UPnP AV, two or more devices including a media server (Media Server) and a device which is called a media renderer (Media Renderer) are connected to one another, and they are controlled by a control point.

A media server manages contents and transmits metadata (Metadata) of contents to the control point in response to a request. The media server also transmits contents to a media renderer in response to a request from the media renderer. The media renderer receives specification of a media server and contents from the control point, and then makes a request of the specified media server to transmit the specified contents thereto, and then plays back the contents transmitted thereto. The control point acquires the metadata of the contents from the media server, and then notifies a URI (Uniform Resource Identifier) of the contents stored in the metadata to the media renderer so as to make this media renderer play them back. In other words, the control point specifies the media server and the contents for the media renderer with the URI.

When making a media renderer play back contents, the user performs the following operations using the control point.

(1) Selection of a media renderer
(2) Selection of a media server
(3) Selection of contents Some of the operations (1) to (3) can be performed automatically.

Conventionally, the client (i.e., the control point) generates display data on the basis of received data (contents, metadata of a device), and displays the data on a display of the client (i.e., the control point) so as to allow the user to perform the operations (1) to (3) on the display of the client (i.e., the control point) (for example, refer to patent reference 1).
[Patent reference 1] JP,2004-348455,A A problem with the conventional control point which performs presentation of a UI (User Interface) as mentioned above is that in a case in which the control point is mounted in a portable apparatus, the display for presenting a selection menu for each of the operations (1) to (3) to be performed on the control point to users is subject to constraints on the data processing performance, storage area, visibility, operability, etc. of the portable apparatus, and therefore the user cannot use any other convenient-to-use display.

The present invention is made in order to solve the above-mentioned problem, and it is therefore an object of the present invention to present a UI which enables a user to select contents in a portable control point having constraints on its data processing performance, storage area, visibility, operability, etc., and to select metadata of a server apparatus by using a display of another apparatus.

DISCLOSURE OF THE INVENTION

A client apparatus in accordance with the present invention includes: a contents list request transmitting means for transmitting a request of a media server apparatus to transmit a contents list which is a list of metadata of contents; a contents list receiving means for receiving the above-mentioned contents list from the above-mentioned media server apparatus; an item list storing means for storing the above-mentioned contents list and an item list having listed items each of which is described as metadata; an item list transmitting means for transmitting the above-mentioned item list to a monitor server apparatus; a key input means for receiving a key input; an input key transmitting means for transmitting the above-mentioned key input to the above-mentioned monitor server apparatus; and an identification information receiving means for receiving identification information making it possible to uniquely identify each of the above-mentioned items included in the above-mentioned item list.

The contents list request transmitting means makes a request of the above-mentioned media server apparatus to transmit the above-mentioned contents list, the above-mentioned contents list receiving means receives the above-mentioned contents list which the above-mentioned contents list request transmitting means has made a request to transmit, and the above-mentioned item list storing means stores the above-mentioned received contents list, so that the above-mentioned client apparatus acquires the above-mentioned contents list which the above-mentioned media server apparatus manages. Furthermore, the above-mentioned item list transmitting means transmits the above-mentioned item list which the above-mentioned item list storing means stores to the above-mentioned monitor server apparatus, the above-mentioned input key transmitting means transmits the above-mentioned key input inputted by the above-mentioned key input means to the above-mentioned monitor server apparatus, and the above-mentioned identification information receiving means receives identification information identifying an item selected on a UI which the above-mentioned monitor server apparatus presents, so that the above-mentioned client apparatus identifies the above-mentioned selected item uniquely.

The client apparatus in accordance with the present invention acquires a contents list from a media server apparatus 101, transfers the contents list to a monitor server apparatus, and presents a UI which enables a user to select contents from the contents list. The client apparatus then transfers the user's key input thereto to the monitor server apparatus so as to handle the UI, and receives identification information identifying the selected contents. The user thus can select contents on a UI which an arbitrary monitor server apparatus presents by simply handling the client apparatus.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
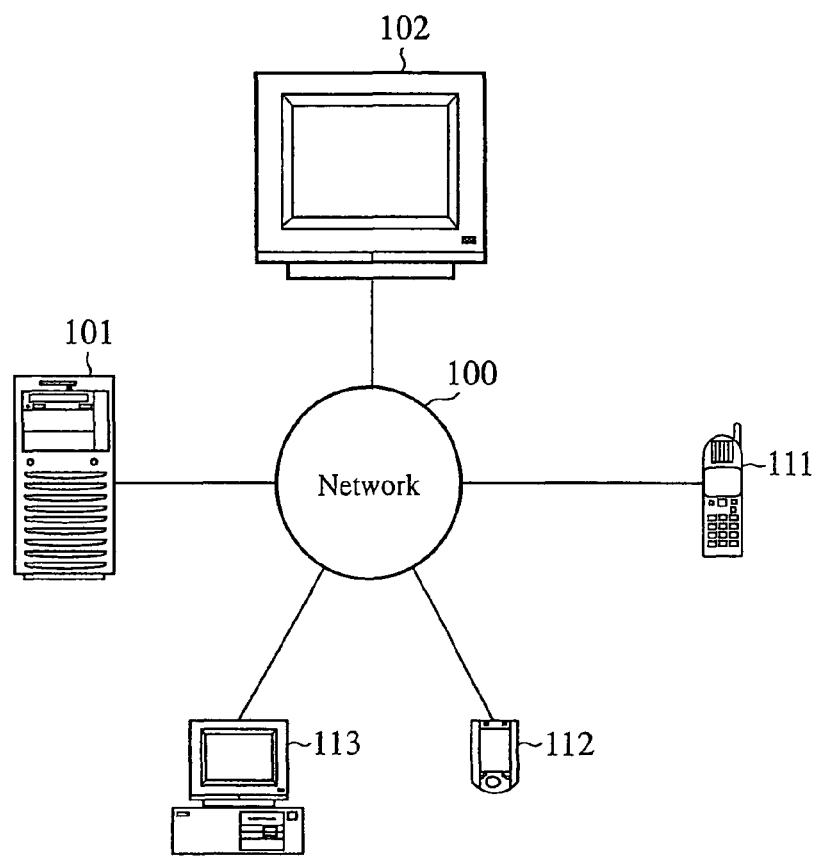
FIG. 1 is a diagram showing a network configuration in accordance with Embodiment 1 of the present invention.

Hereafter, Embodiment 1 will be explained. FIG. 1 is a diagram showing a network configuration in accordance with Embodiment 1 of the present invention. In FIG. 1, a media server apparatus 101 and a monitor server apparatus 102 carry out processes according to a request from each of various client apparatuses. A mobile phone 111, a PDA (Personal Digital Assistant) 112, and a client PC 113 are client apparatuses each of which makes a request of the media server apparatus 101 and the monitor server apparatus 102 to carry out processes. These apparatuses are connected to one another via a network 100. Other electronic equipment or another apparatus can be connected, as a client apparatus, to the network 100.

Although the network 100 can be configured in a wide variety of forms, to say the least, it is a network by cable or radio. When each equipment shown in FIG. 1 is placed in a state in which it can communicate with other equipment according to a specific protocol, for example, IP (Internet Protocol), it can be assumed that it is placed in a state in which it is connected to the network 100.

Server apparatuses and client apparatuses which are connected to the network 100 have the following basic functions:
(1) A function of detecting a server apparatus by each client apparatus, and
(2) A function of making a request of a server apparatus to perform a process by each client apparatus.

Hereafter, the two above-mentioned basic functions will be explained.

First, the basic function (1): "the function of detecting a server apparatus by each client apparatus" will be explained. Each client apparatus detects each server apparatus connected thereto via the network 100, and acquires information about each server apparatus as metadata. For example, a client apparatus which is called a control point in UPnP detects a server apparatus which is called an arbitrary type of UPnP device by performing a discovery process. The client apparatus then carries out a description process so as to acquire, as an XML (extensible Markup Language) document which is called a device description, metadata in which the name of the target UPnP device and available functions which are called services are described. The control point acquires, as an XML document which is called a service description, metadata in which an action (i.e., a process which is implemented beforehand) provided by each service which is described in the device description is described.

Next, the basic function (2): "the function of making a request of a server apparatus to perform a process by each client apparatus" will be explained. Each client apparatus can make a request of a detected server apparatus to perform a specific process, and can receive processed results from the detected server apparatus. Depending upon the process, the server apparatus receives parameters. For example, in UPnP, the control point refers to the service description acquired from the UPnP device, makes a request of the UPnP device to execute an action, and acquires execution results from the UPnP device.

Figure 2:
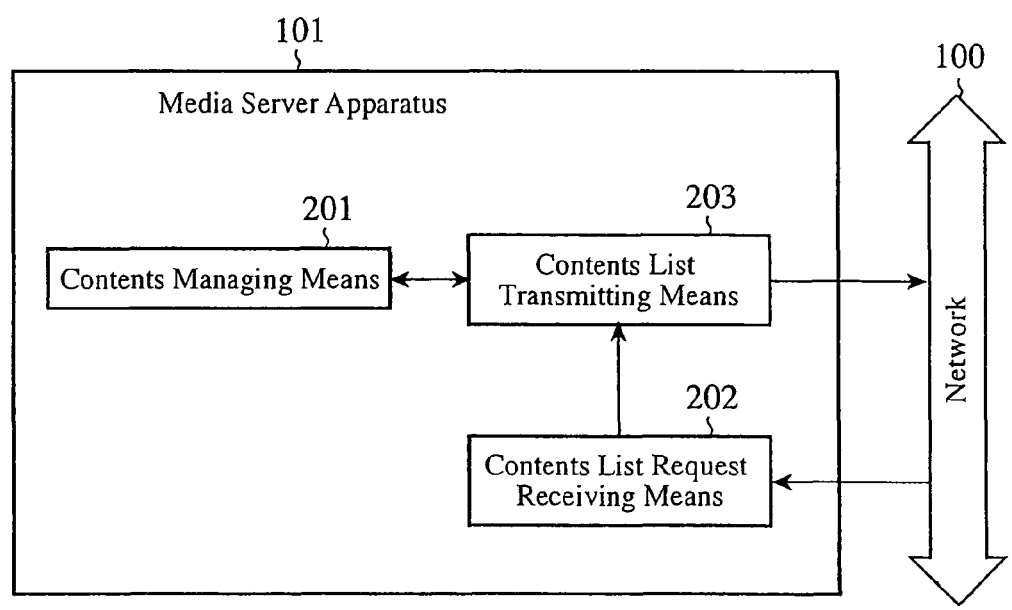
FIG. 2 is a diagram showing the structure of a media server apparatus 101 shown in FIG. 1.

Hereafter, each apparatus which constructs the network of FIG. 1 will be explained. FIG. 2 is a diagram showing the structure of the media server apparatus 101 in FIG. 1.

A contents managing means 201 manages contents, such as a video, a piece of music, and a photo, and manages information about each contents, such as the title, maker, and genre of each contents, as metadata. A list of metadata of contents which the contents managing means 201 manages is referred to as a contents list.

A contents list request receiving means 202 receives a contents list request to transmit the contents list from a client apparatus through the network 100.

A contents list transmitting means 203 transmits the contents list which the contents managing means 201 manages in response to the contents list request which the contents list request receiving means 202 has received to the client apparatus through the network 100.

Figure 3:
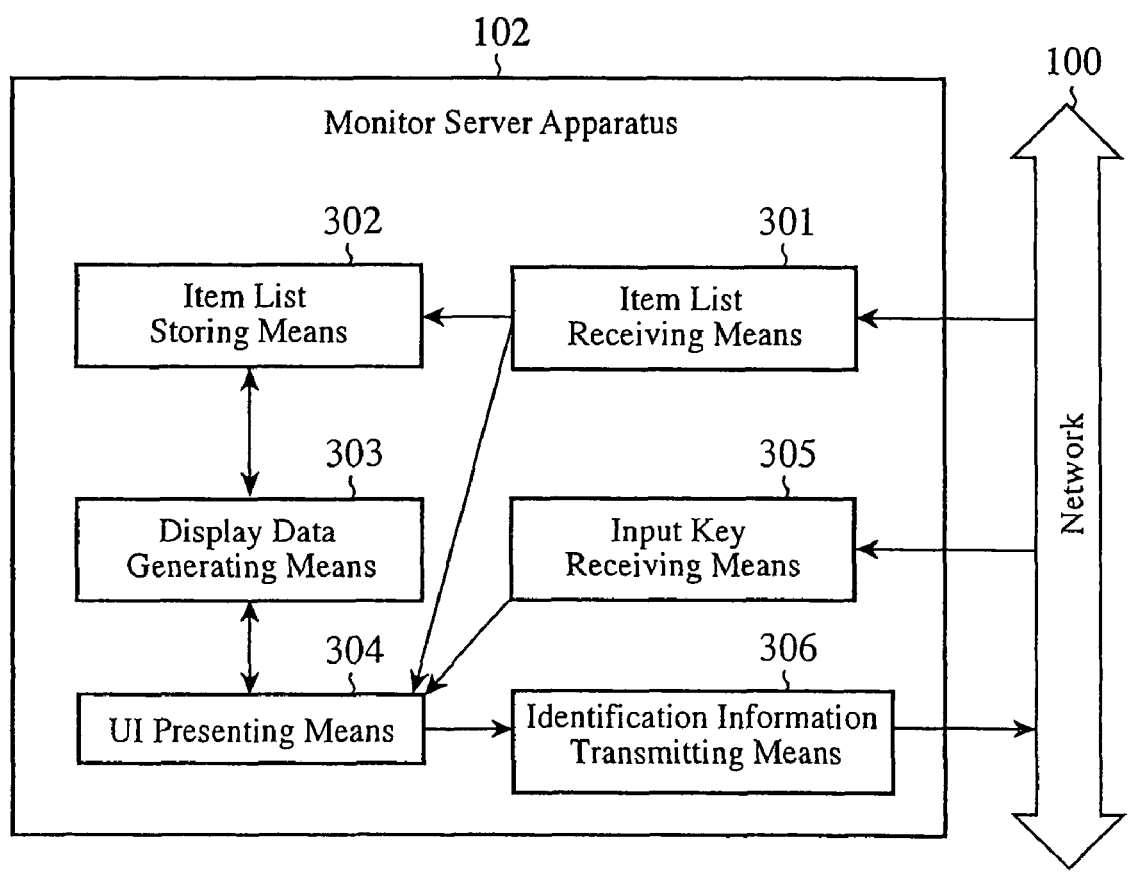
FIG. 3 is a diagram showing the structure of a monitor server apparatus 102 shown in FIG. 1.

FIG. 3 is a diagram showing the structure of the monitor server apparatus 102 shown in FIG. 1. An item list receiving means 301 receives an item list which is a list of items which is to be presented in a selection menu from the network 100, and an item list storing means 302 stores the item list therein. The details of the item list will be mentioned later.

A display data generating means 303 generates display data which are used for generation of a screen display by a UI presenting means 304 which will be mentioned later on the basis of the item list which the item list storing means 302 stores. The display data indicate character strings and images to be displayed, and their positions on the screen. For example, in a case in which the name of contents is included in each item, the name of the contents is also included in the display data. In a case in which the URI of a thumbnail image of contents is included in each item, the display data generating means acquires a file of the thumbnail image and includes it in the display data. Furthermore, in a case in which the title of the item list is embedded into the item list, the display data generating means can define the title of the item list as the title of the UI which the below-mentioned UI presenting means 304 presents.

The UI presenting means 304 displays the display data generated by the display data generating means on the display, and handles the UI on the basis of an input key which it receives from an input key receiving means 305 which will be mentioned later.

The input key receiving means 305 receives the input key from the network 100, and outputs it to the UI presenting means 304.

An identification information transmitting means 306 transmits identification information to the network 100. The identification information is information which makes it possible to identify each item included in the item list uniquely. For example, the identification information transmitting means 306 transmits the identification information which is beforehand described for each item included in the item list.

Figure 4:
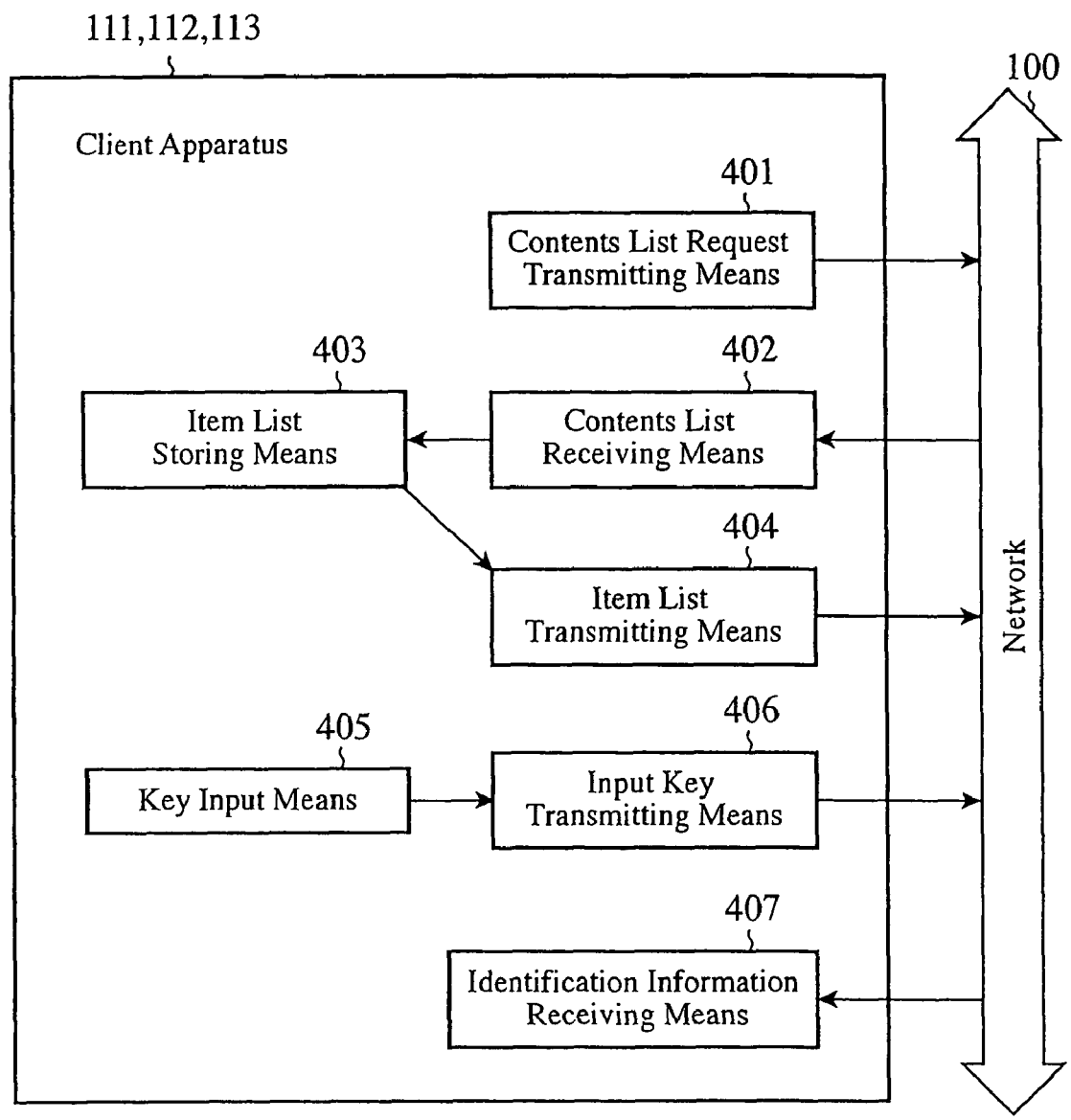
FIG. 4 is a diagram showing the structure of a client apparatus shown in FIG. 1.

FIG. 4 is a diagram showing the structure of each client apparatus shown in FIG. 1. In FIG. 1, the mobile phone 111, the PDA 112, and the client PC 113 are client apparatuses.

In FIG. 4, a contents list request transmitting means 401 transmits a contents list request to transmit a contents list to the network 100.

A contents list receiving means 402 receives the contents list which the contents list request transmitting means 401 has made a request to transmit from the network 100.

An item list storing means 403 stores the contents list which the contents list receiving means 402 has received therein.

An item list transmitting means 404 transmits the item list which the item list storing means 403 stores therein to the network 100. When transmitting the item list, the item list transmitting means 404 can add the title of the item list to the item list and transmit this item list.

A key input means 405 is a unit for enabling the user to input a key to the client apparatus. An input key transmitting means 406 transmits the key inputted by the user through the key input means 405 to the network 100.

An identification information receiving means 407 receives identification information from the network 100.

Next, a processing sequence between a client apparatus and the server apparatuses shown in FIG. 1 will be explained. The whole processing sequence is divided roughly into a processing sequence (1) between a client apparatus and a media server apparatus 101, a processing sequence (2) between a client apparatus and the monitor server apparatus 102, and a process flow (3) of a client apparatus, and they will be explained in turn.

Figure 5:
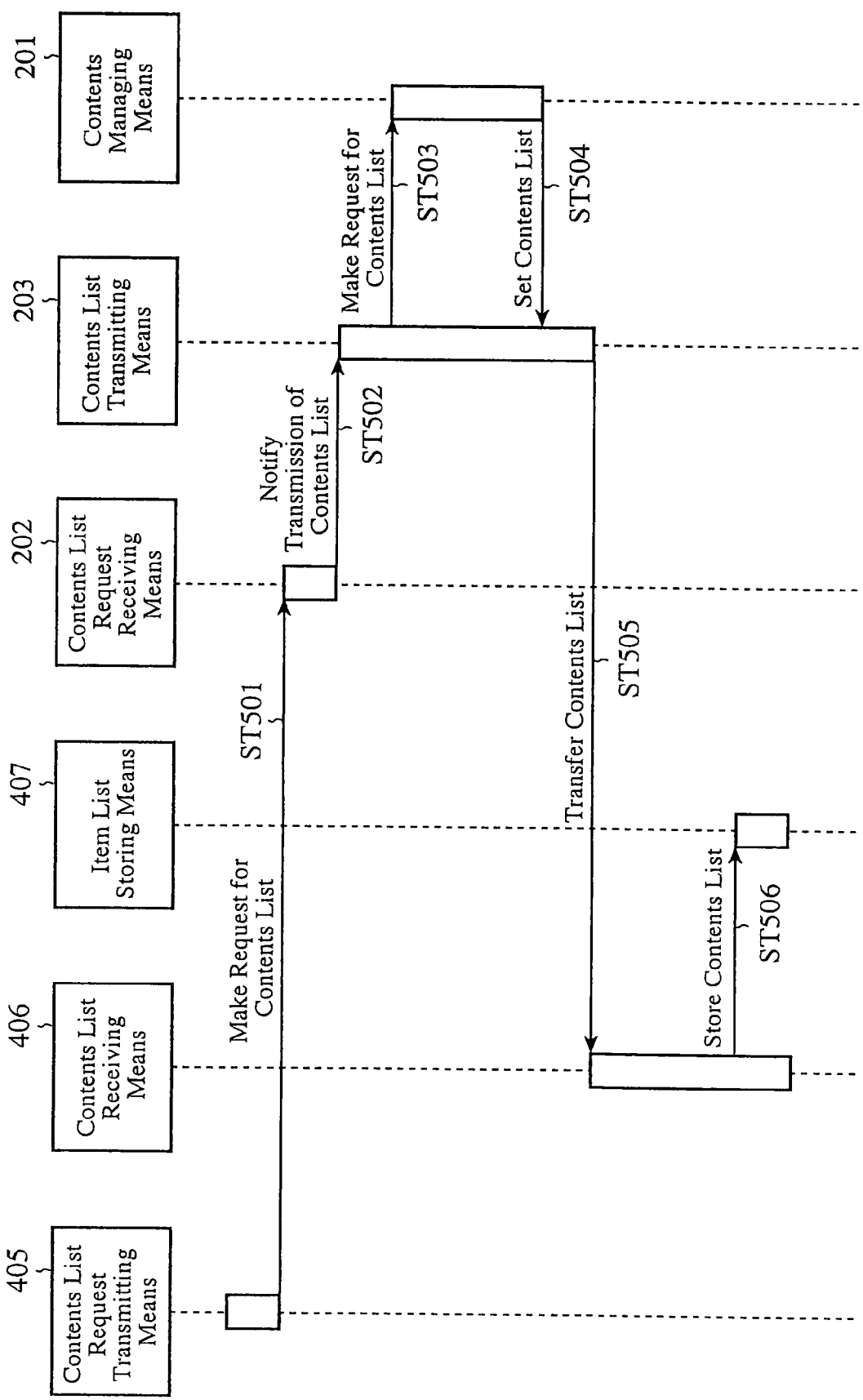
FIG. 5 is a diagram showing a processing sequence between the media server apparatus 101 of FIG. 2, and the client apparatus of FIG. 4.

First, "a processing sequence (1) between a client apparatus and the media server apparatus 101" will be explained. FIG. 5 is a diagram showing the processing sequence between the media server apparatus 101 shown in FIG. 2 and a client apparatus shown in FIG. 4. Blocks each having the same functions as a corresponding block of the media server apparatus 101 shown in FIG. 2 or a corresponding block of the client apparatus shown in FIG. 4 are designated by the same reference numerals as shown in FIG. 2 or 4, and therefore the explanation of the blocks will be omitted hereafter. According to the processing sequence of FIG. 5, the client apparatus acquires the contents list from the media server apparatus 101.

In step ST501 of FIG. 5, the contents list request transmitting means 401 transmits a contents list request and the contents list request receiving means 202 then receives the contents list request. The client apparatus thus makes a request of the media server apparatus 101 to transmit the contents list.

In step ST502, the contents list request receiving means 202 which has received the contents list request notifies a start of transmission of the contents list to the contents list transmitting means 203 so as to allow the contents list transmitting means to start a transmission process of transmitting the contents list.

In step ST503, the contents list transmitting means 203 makes a request of the contents managing means 201 to deliver the contents list thereto.

In step ST504, the contents list which the contents list transmitting means 203 has made a request to deliver is set to the contents list transmitting means 203.

In step ST505, the contents list transmitting means 203 transmits the contents list to the client apparatus, and the contents list receiving means 402 receives the contents list. The contents list is thus transferred from the media server apparatus 101 to the client apparatus.

In step ST506, the item list storing means 403 stores the contents list therein.

Figure 6:
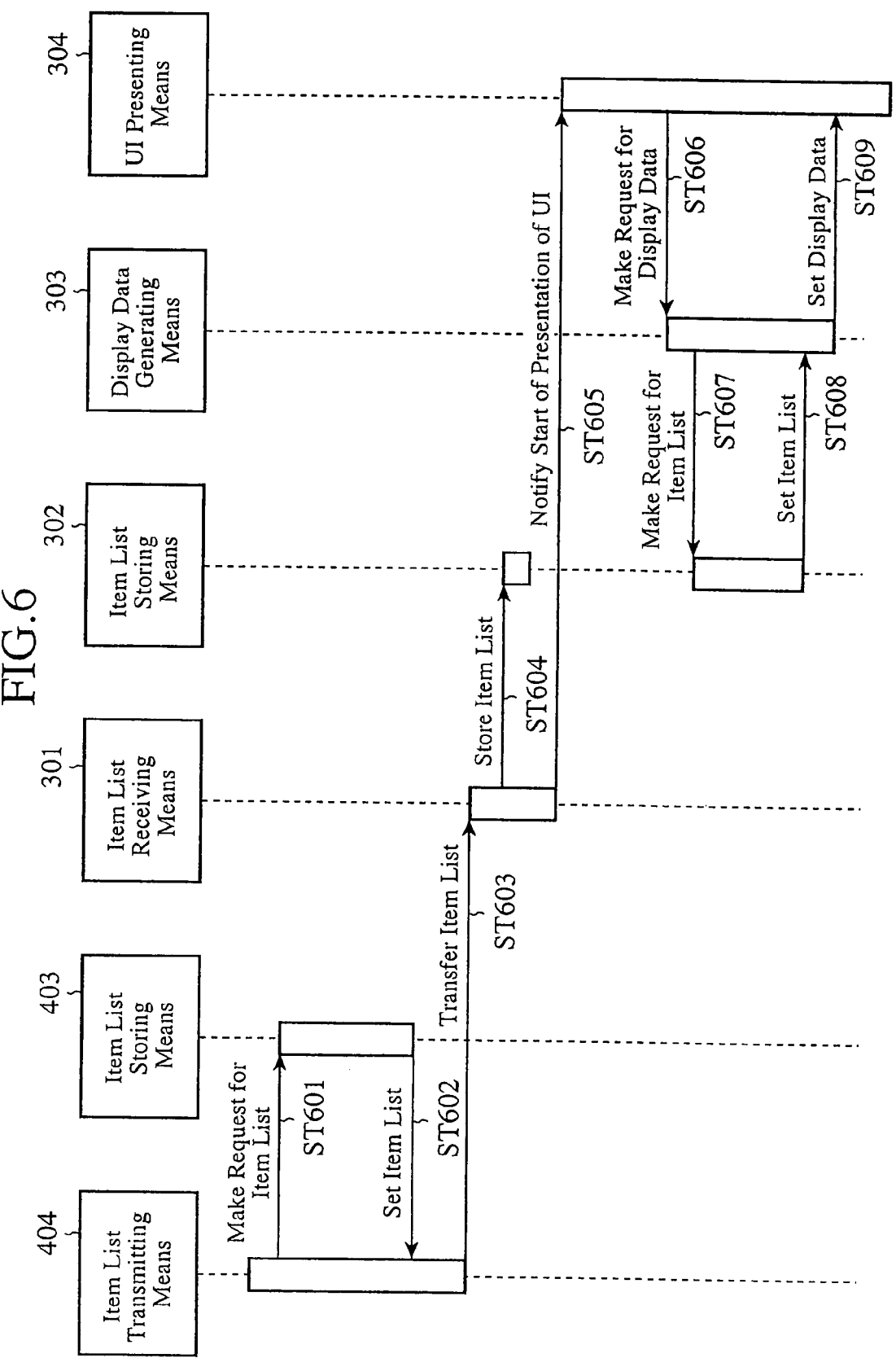
FIG. 6 is a diagram showing a processing sequence between the monitor server apparatus 102 of FIG. 3 and the client apparatus of FIG. 4.
Figure 7:
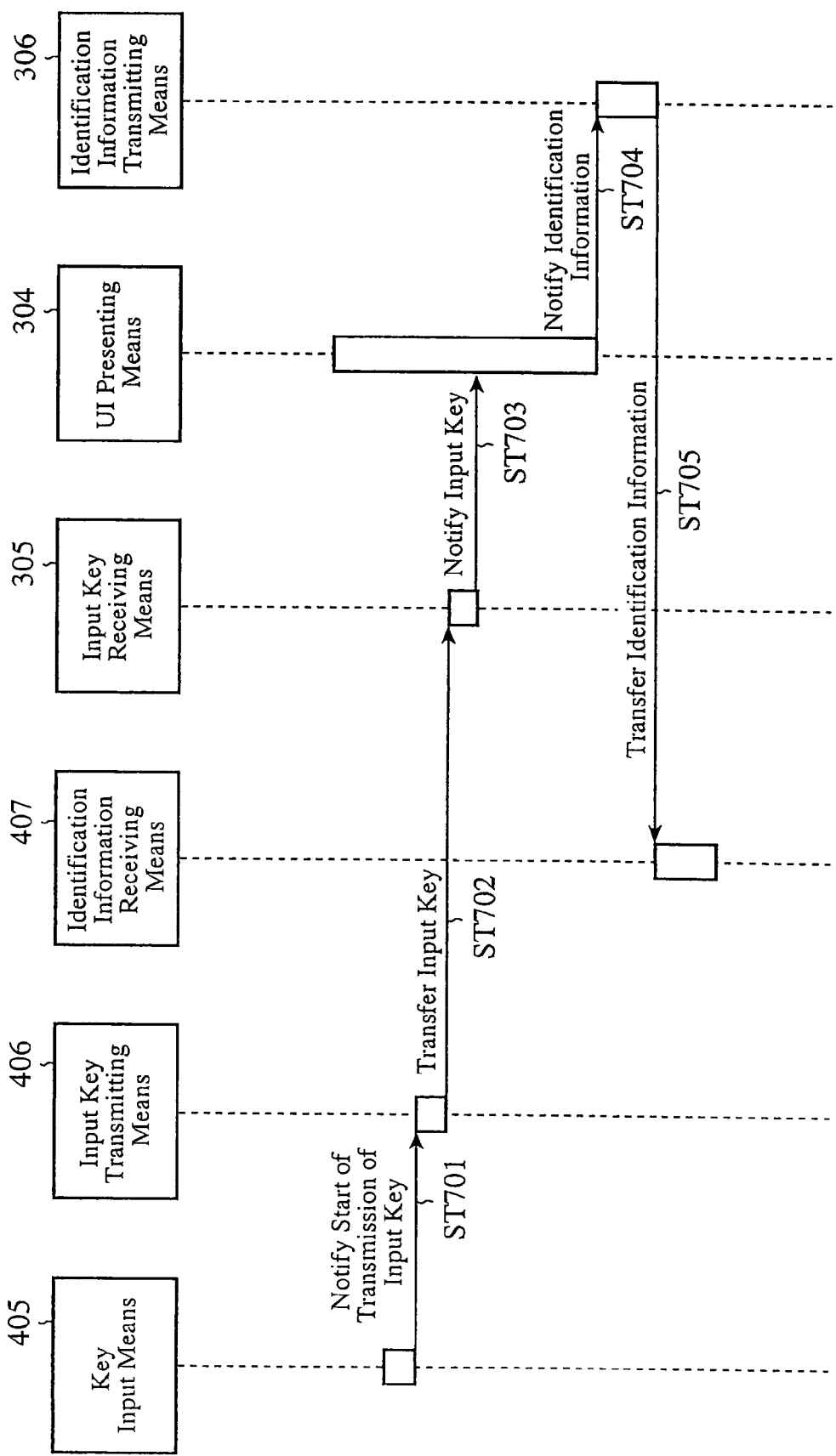
FIG. 7 is a diagram showing a processing sequence between the monitor server apparatus 102 of FIG. 3 and the client apparatus of FIG. 4.

Next, "a processing sequence (2) between a client apparatus and the monitor server apparatus 102" will be explained. FIGS. 6 and 7 are diagrams showing the processing sequence between the monitor server apparatus 102 shown in FIG. 3 and a client apparatus shown in FIG. 4. Blocks each having the same functions as a corresponding block of the monitor server apparatus 102 shown in FIG. 3 or a corresponding block of the client apparatus shown in FIG. 4 are designated by the same reference numerals as shown in FIG. 3 or 4, and therefore the explanation of the blocks will be omitted hereafter.

First, the processing sequence will be explained with reference to FIG. 6. According to the processing sequence of FIG. 6, a client apparatus sets up an item list to be displayed on a UI which the monitor server apparatus 102 presents.

In step ST601 of FIG. 6, the item list transmitting means 404 of the client apparatus makes a request of the item list storing means 403 to deliver an item list.

In step ST602, the item list transmitting means 404 sets the item list which it has made a request to deliver thereto.

In step ST603, the item list set to the item list transmitting means 404 is transferred from the item list transmitting means 404 to the list receiving means 301.

In step ST604, the item list storing means 302 stores the item list which the item list receiving means 301 has received.

In step ST605, the item list receiving means 301 notifies a start of a UI presentation to the UI presenting means 304.

In step ST606, the UI presenting means 304 makes a request of the display data generating means 303 to deliver data to be displayed.

In step ST607, the display data generating means 303 makes a request of the item list storing means 302 to deliver the item list.

In step ST608, the display data generating means 303 sets the item list which it has made a request to deliver thereto.

In step ST609, the display data generating means 303 generates display data on the basis of the item list, and sets the display data to the UI presenting means 304. The UI presenting means 304 presents a UI (refer to FIG. 9) according to the display data set thereto. The item list exists on the presented UI.

Next, an explanation will be made with reference to FIG. 7. According to the processing sequence of FIG. 7, the client apparatus acquires identification information identifying an item selected as a result of input of a key.

In step ST701 of FIG. 7, the key input means 405 notifies the key input to the client apparatus to the input key transmitting means 406 while attaching the input key to the notification.

In step ST702, the input key is transferred from the client apparatus to the monitor server apparatus 102, and is received by the input key receiving means 305.

In step ST703, the input key which the input key receiving means 305 has received is notified to the UI presenting means 304 so that the UI which the UI presenting means 304 presents is handled according to the input key.

In step ST704, when an item is selected through the user's operation of the UI, the identification information identifying the selected item is notified from the UI presenting means 304 to the identification information transmitting means 306.

In step ST705, the identification information identifying the item is transmitted from the identification information transmitting means 306 to the client apparatus, and is received by the identification information receiving means 407.

Figure 8:
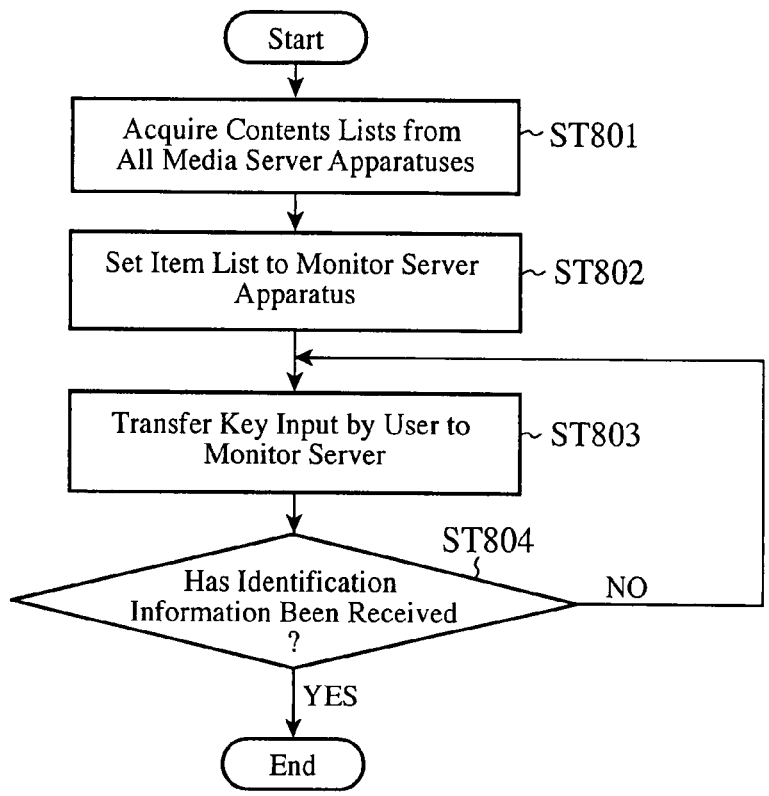
FIG. 8 is a flow chart showing a flow of a process carried out by the client apparatus of FIG. 4.

Next, "a process flow (3) of a client apparatus" will be explained. FIG. 8 is a flow chart showing a flow of a process carried out by a client apparatus shown in FIG. 4. The process flow of the client apparatus will be explained with reference to FIG. 8.

In step ST801, the client apparatus acquires the contents list from each of all media server apparatuses 101 on the basis of the above-mentioned processing sequence (FIG. 5) between a client apparatus and a media server apparatus 101. As an alternative, the client apparatus can acquire the contents list from each of some of all the detected media server apparatuses 101.

In step ST802, the client apparatus transfers the item list to the monitor server apparatus 102 on the basis of the above-mentioned processing sequence (FIG. 6) between a client apparatus and the monitor server apparatus 102.

In step ST803, the client apparatus transfers the user's input key to the monitor server 102 on the basis of the above-mentioned processing sequence (FIG. 7) between a client apparatus and the monitor server apparatus 102.

In step ST804, the client apparatus judges whether it has received the identification information identifying the selected item. When the client apparatus has received the identification information, it ends the processing sequence, or otherwise returns to step ST803.

Figure 9:
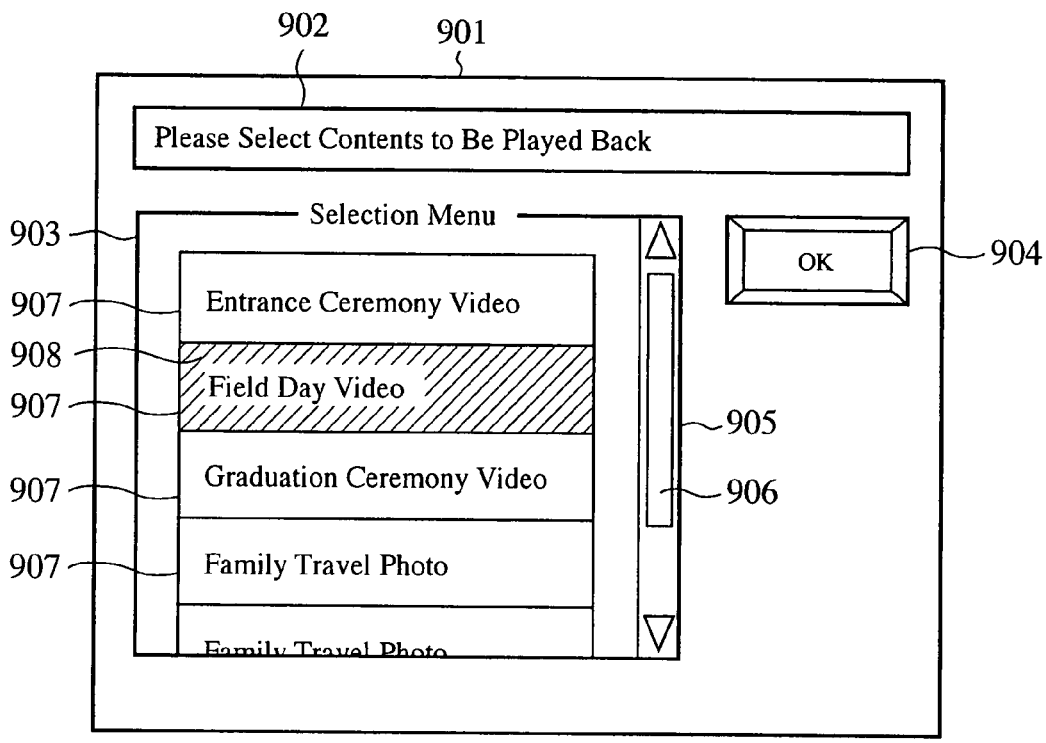
FIG. 9 is a diagram showing a UI which a UI presenting means 304 of FIG. 3 presents.

Next, the UI which the monitor server apparatus 102 presents will be explained. FIG. 9 is a diagram showing the UI which the UI presenting means 304 of FIG. 3 presents. The UI presented by the UI presenting means 304 is handled on the basis of the input key which the input key receiving means 305 has received.

In FIG. 9, an outer frame 901 shows a screen or window in which the UI is presented. A menu title 902 shows the title or objective of a menu screen. A UI part 903 is a display of a list of items included in the item list. Only some of the items are displayed when all the items cannot be displayed in the UI part 903. A UI part 904 is a button which the user presses down when he or she finally determines to select an item on which the UI has focused attention in the UI part 903. A UI part 905 shows a range of a portion (some items) currently shown in the UI part 903 using both a ratio of the total length of a UI part 906 to that of the UI part 905 and the position of the UI part 906 with respect to the UI part 905. Each item name 907 displayed in the UI part 903 corresponds to one item included in the item list, and shows the name of the corresponding item. An item background 908 has an effect of changing its color to specify the item on which the UI has focused attention.

When the input key which the input key receiving means 305 of FIG. 3 has received indicates a rightward or leftward movement, the focus moves between the UI part 903 and the UI part 904 according to the input key. When the input key indicates an upward or downward movement, the focus moves within the UI part 903. When the button of the UI part 904 is pressed down, the identification information transmitting means 306 of FIG. 3 transmits identification information identifying the item on which the focus is put in the UI part 903 to the identification information receiving means 407 of the client apparatus.

Figure 10:
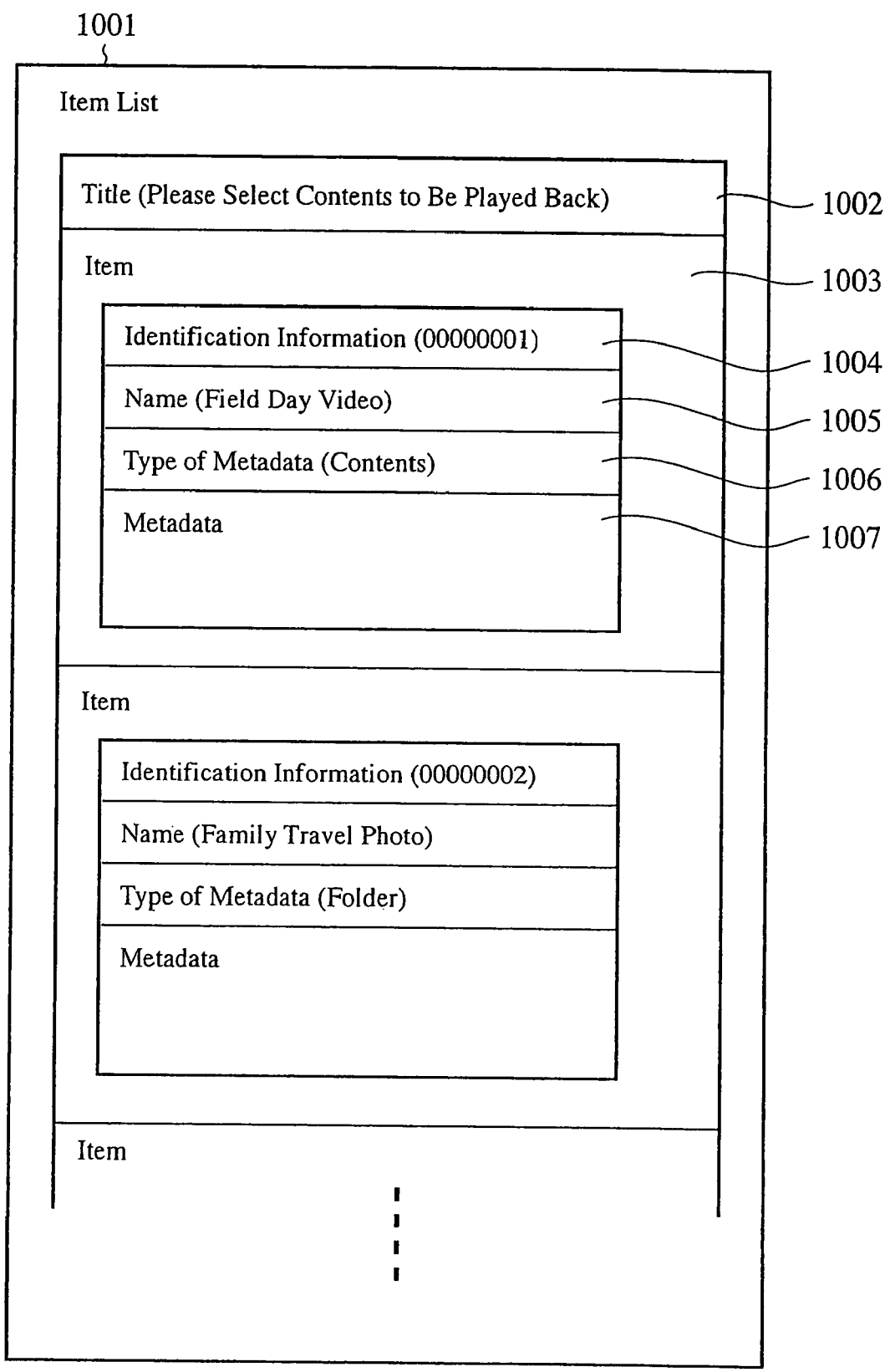
FIG. 10 is a diagram showing the structure of an item list displayed on the UI of FIG. 9.

Next, the item list will be explained. FIG. 10 is a diagram showing the structure of the item list which is displayed on the UI of FIG. 9. The item list is an array of items in each of which information which the user can select on the UI (FIG. 9) is stored, the item list being displayed in the UI presented by the monitor server apparatus 102. The item list has an embedded structure as shown in FIG. 10, and is described in XML.

In FIG. 10, the item list 1001 stores an array of items 1003. Other information which is to be presented to the user on the UI of FIG. 9 can be stored in the item list 1001. For example, the item list can store a UI menu title 1002 and can present the UI menu title 902 as shown in FIG. 9. Each item 1003 stores identification information 1004 which makes it possible to identify a corresponding item itself, and a name 1005 indicating a character string to be displayed on the UI. Names 1005 are listed in the form of item names 907 in the UI part 903 of the UI of FIG. 9. Each item 1003 can also include a type 1006 of metadata, and metadata 1007. For example, when an item 1003 indicates a video content, its metadata 1007 contains the metadata of the video content, and its type 1006 of metadata indicates contents. When an item 1003 indicates a folder, its metadata 1007 contains the path and so on of the folder, and its type 1006 of metadata indicates folder. The display data generating means 303 can change the arrangement of the UI parts 903, 904, and 905 according to the types 1006 of metadata.

As mentioned above, in accordance with Embodiment 1, each client apparatus which is network connection equipment acquires a contents list from a media server apparatus 101, and transfers the contents list to a monitor server apparatus 102 so as to present a UI which enables the user to select contents from the contents list to the user. The client apparatus then transfers the user's key input to the monitor server apparatus 102 so as to make it handle the UI, and receives identification information identifying the selected contents. As a result, the user can select contents on a UI which an arbitrary monitor server apparatus 102 presents by simply handling a client apparatus.

Embodiment 2

Figure 11:
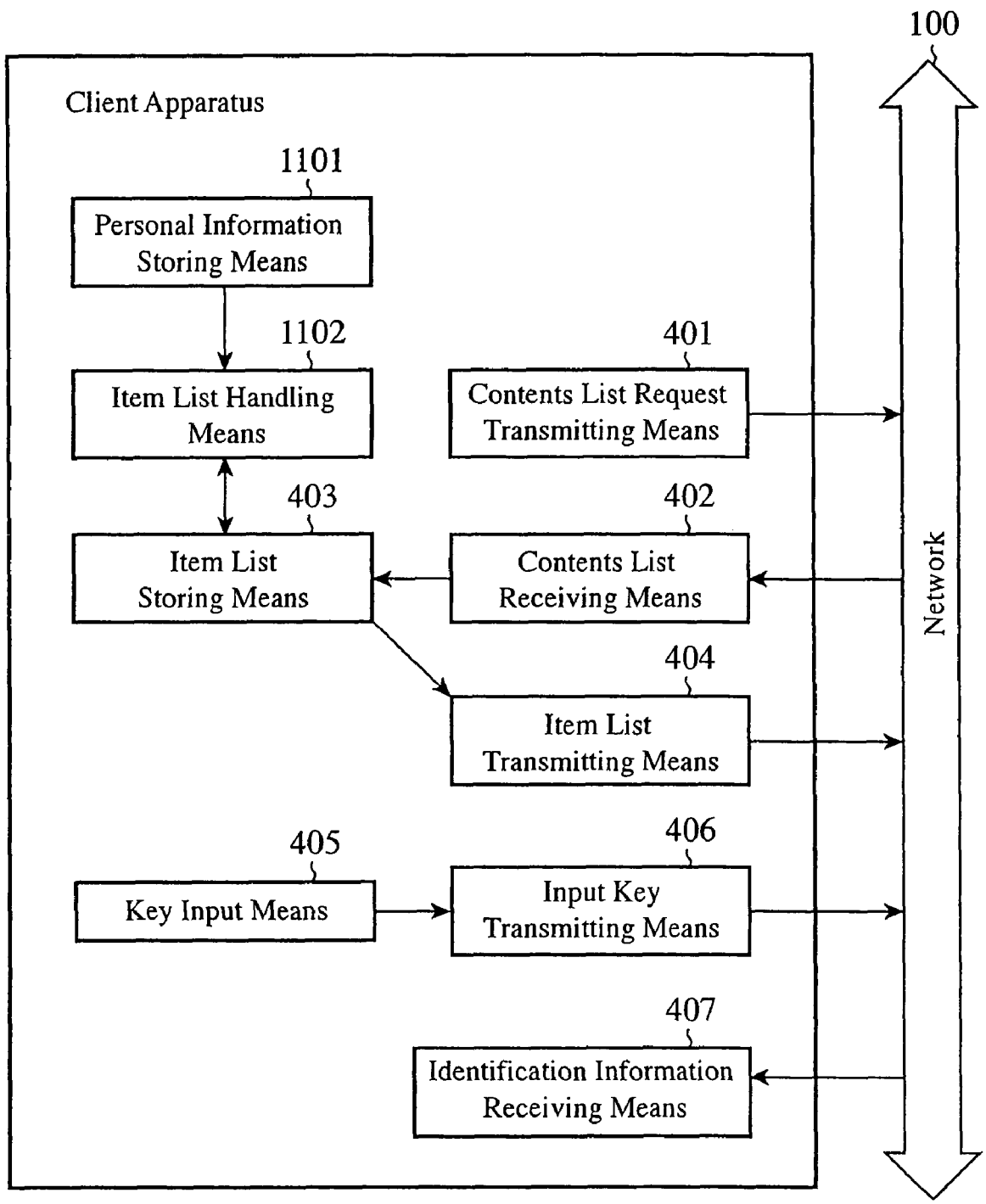
FIG. 11 is a diagram showing the structure of a client apparatus in accordance with Embodiment 2 of the present invention.

In Embodiment 2, a client apparatus in accordance with Embodiment 1 is so modified as to store personal information about the user, and to handle the item list which the item list storing means 403 stores on the basis of the personal information, thereby providing an operation environment which is suited to the user. FIG. 11 is a diagram showing the structure of a client apparatus in accordance with Embodiment 2 of the present invention. The client apparatus of FIG. 11 is so constructed as to have a personal information storing means 1101 and an item list handling means 1102 in addition to the components of a client apparatus in accordance with Embodiment 1 (FIG. 4). Blocks each having the same functions as a corresponding block of a client apparatus in accordance with Embodiment 1 are designated by the same reference numerals as shown in FIG. 4, and therefore the explanation of the blocks will be omitted hereafter.

In FIG. 11, the personal information storing means 1101 stores personal information about the user of the client apparatus. For example, the history of items selected in the past, the frequency with which each item has been selected, information about tastes for video, music, photo, etc. are included in the personal information. The item list handling means 1102 handles the item list which the item list storing means 403 stores.

Figure 12:
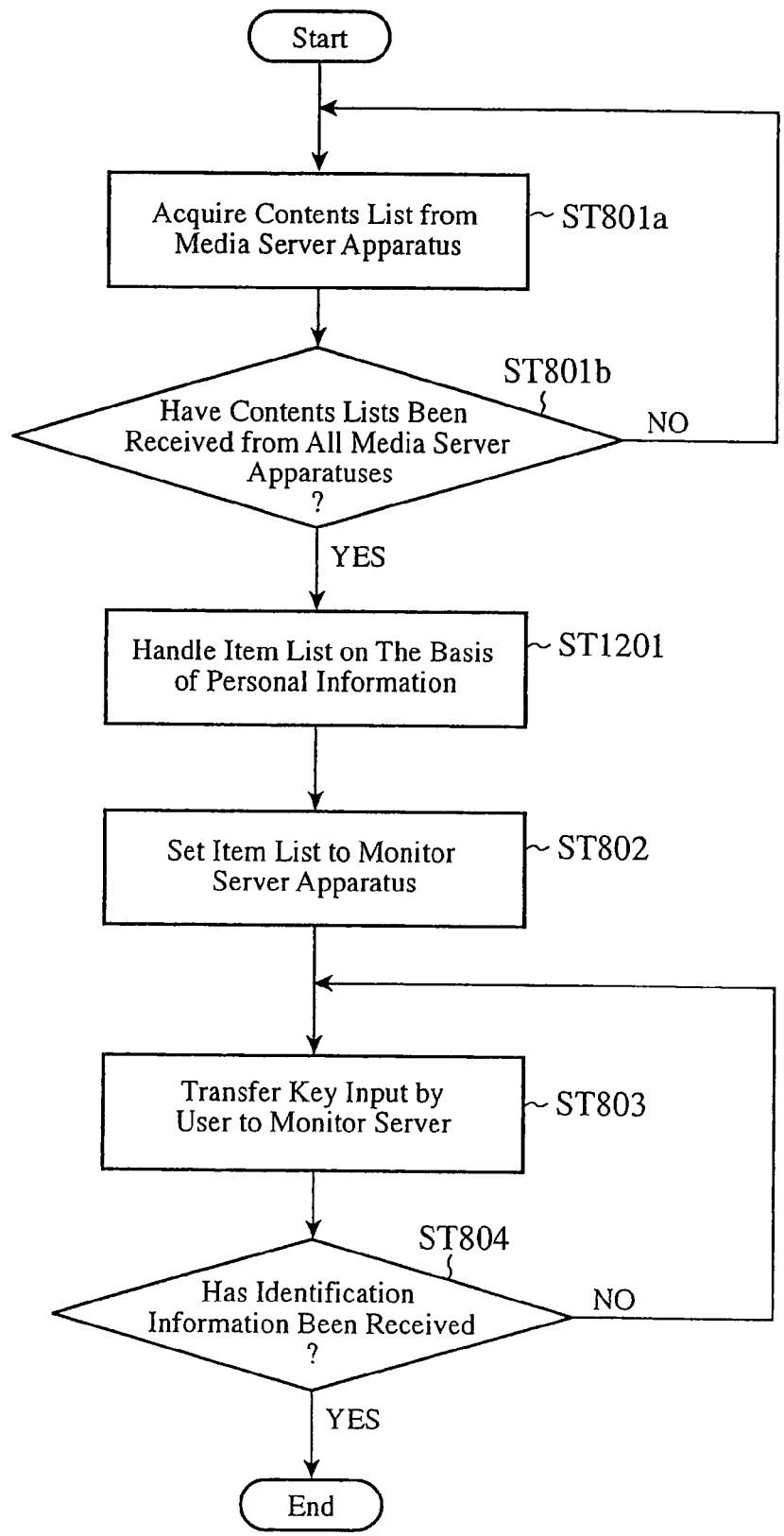
FIG. 12 is a flow chart showing a flow of a process carried out by the client apparatus of FIG. 11.

Next, the processing sequence of the client apparatus will be explained. In Embodiment 2, an operation of adding an item to the item list using above-mentioned personal information is added to the process flow of a client apparatus shown in FIG. 8. FIG. 12 is a flow chart showing a flow of the process carried out by the client apparatus of FIG. 11. The same steps of those of the process of the client apparatus shown in FIG. 8 are designated by the same reference numerals as shown in FIG. 8, and the explanation of the steps will be omitted hereafter.

In step ST1201 of FIG. 12, the item list handling means 1102 handles the item list which the item list storing means 403 stores on the basis of the personal information which the personal information storing means 1101 stores. For example, the item list handling means arranges the item list in such a way that the items included in the item list are aligned in order of degreasing number of times that each of the items has been selected, or in order of decreasing number of times that a keyword set to the taste information appears in the explanation of each corresponding contents.

As mentioned above, each client apparatus in accordance with Embodiment 2 can reflect a result of performing a process which is suited to the user in the UI which the monitor server apparatus 102 presents.

Embodiment 3

Figure 13:
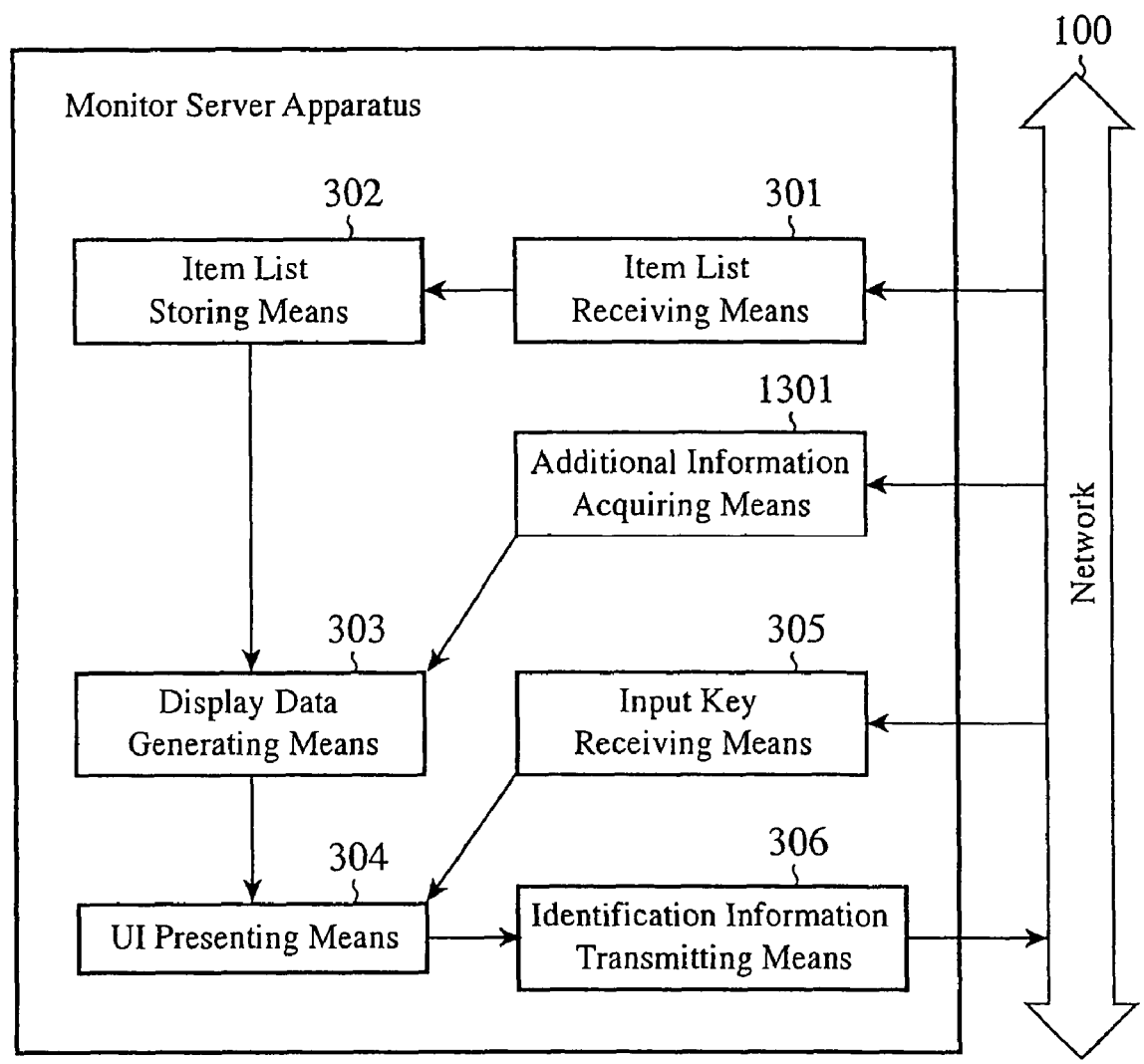
FIG. 13 is a diagram showing the structure of a monitor server apparatus 102 in accordance with Embodiment 3 of the present invention.

In accordance with Embodiment 3, a function of acquiring additional information relevant to each item included in the item list from the inside and outside of a monitor server apparatus 102 is added to a monitor server apparatus 102 of Embodiment 1 so that the information other than information sent from a client apparatus can also be presented for the user. For example, in a case in which each item is related to a music album, a thumbnail of the jacket image of the music album is also presented as additional information. FIG. 13 is a diagram showing the structure of a monitor server apparatus 102 in accordance with Embodiment 3 of the present invention. The monitor server apparatus 102 of FIG. 13 is so constructed as to include an additional information acquiring means 1301 in addition to the components of a monitor server apparatus of Embodiment 1 (FIG. 3). Blocks each having the same functions as a corresponding block of a monitor server apparatus in accordance with Embodiment 1 are designated by the same reference numerals as shown in FIG. 3, and therefore the explanation of the blocks will be omitted hereafter.

In FIG. 13, the additional information acquiring means 1301 searches through the inside of the monitor server apparatus 102 and the network so as to acquire information relevant to each item. For example, the additional information acquiring means searches through webs with the artist name of a music content so as to acquire artist information, or searches through webs with the title of a music album to acquire the jacket image of the music album. When a URI of a thumbnail image is described in the metadata of an item, the additional information acquiring means 1301 acquires the thumbnail image from the URI. When generating display data from the item list, the display data generating means 303 generates the display data on the basis of the additional information about each item which the additional information acquiring means 1301 has acquired.

Figure 14:
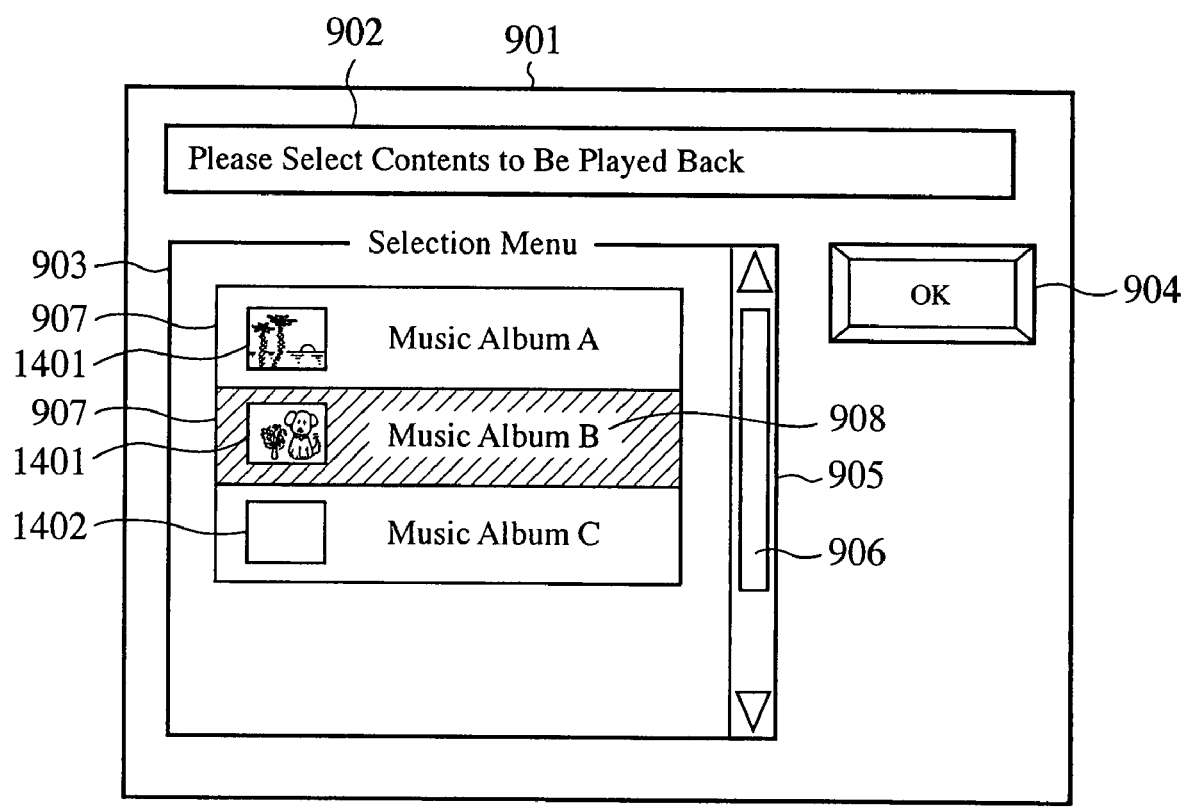
FIG. 14 is a diagram showing a UI which a UI presenting means 304 of FIG. 13 presents.

Next, a UI will be explained. FIG. 14 is a diagram showing the UI which the UI presenting means 304 of FIG. 13 presents. FIG. 14 shows an example of the UI which the UI presenting means 304 presents to show the display data in which the jacket images of music albums are aligned on a left side of the titles of the music albums, the display data being generated by the display data generating means 303. Blocks each having the same functions as a corresponding block of the user interface in accordance with Embodiment 1 are designated by the same reference numerals as shown in FIG. 9, and therefore the explanation of the blocks will be omitted hereafter.

In FIG. 14, when the jacket images of the music albums are acquired by the additional information acquiring means 1301, each jacket image is arranged in a corresponding thumbnail area 1401 by the display data generating means 303. When any jacket image of a music album cannot be acquired, no thumbnail image is arranged for the music album (see a thumbnail area 1402 in the figure). The positions of the thumbnail areas 1401 and 1402 which the display data generating means 303 determines can be anywhere as long as the user is enabled to recognize the corresponding music albums. For example, they can be displayed on the left side of the titles of the music albums, or in the background of the titles of the music albums.

As mentioned above, the monitor server apparatus 102 in accordance with Embodiment 3 adds information acquired from an apparatus other than client apparatuses, and therefore can present information which does not exist in any client apparatus and any server apparatus to the user.

Embodiment 4

Figure 15:
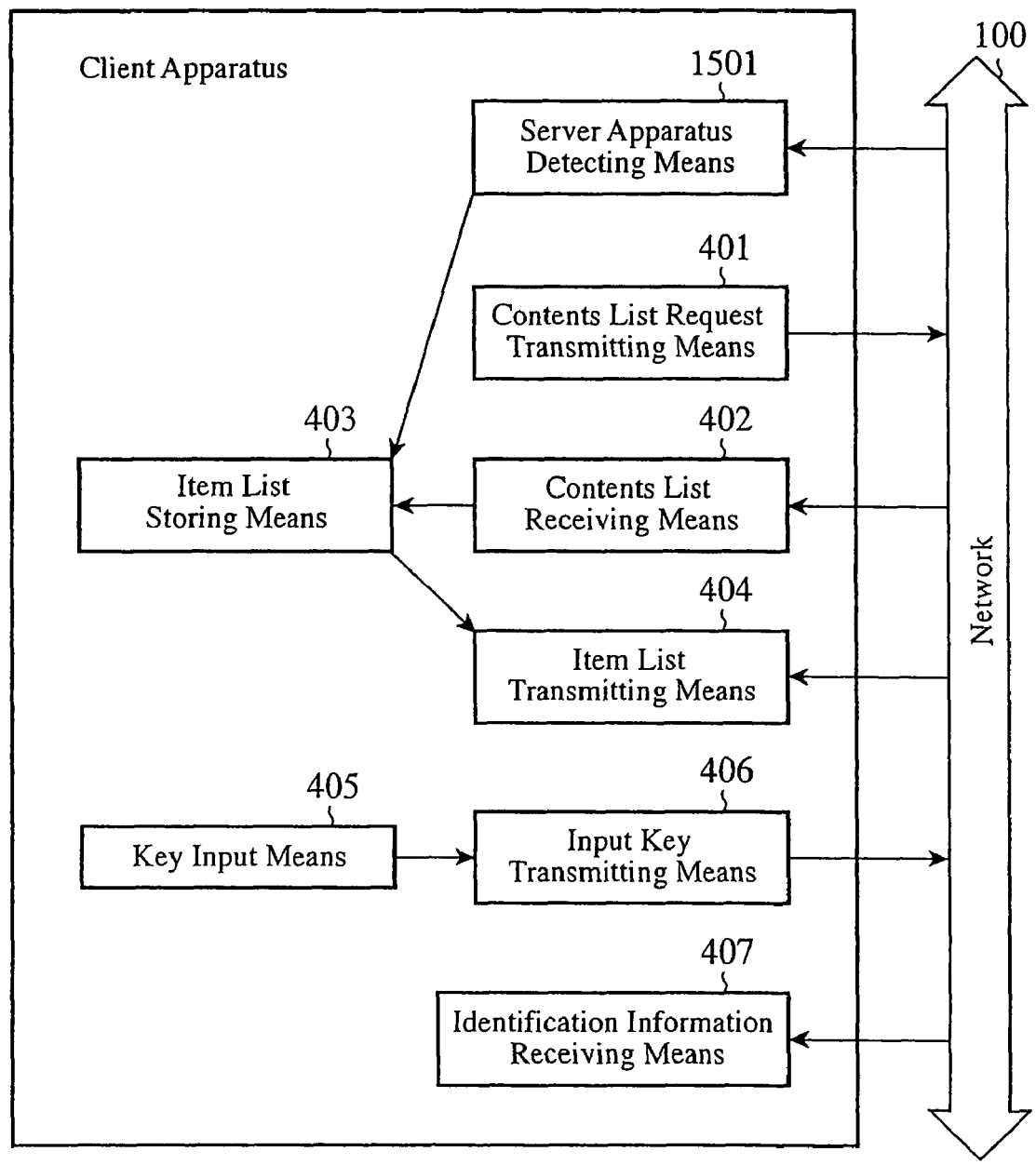
FIG. 15 is a diagram showing the structure of a client apparatus in accordance with Embodiment 4 of the present invention.

A client apparatus in accordance with Embodiment 1 handles a contents list acquired from a media server apparatus 101. In contrast, a client apparatus in accordance with Embodiment 4 selects a server apparatus on a UI presented by a monitor server apparatus 102 by using metadata about the server apparatus. FIG. 15 is a diagram showing the client apparatus in accordance with Embodiment 4 of the present invention. The client apparatus of FIG. 15 is so constructed as to have a server apparatus detecting means 1501 in addition to the components of a client apparatus in accordance with Embodiment 1 (FIG. 4). Blocks each having the same functions as a corresponding block of a client apparatus in accordance with Embodiment 1 are designated by the same reference numerals as shown in FIG. 4, and therefore the explanation of the blocks will be omitted hereafter.

In FIG. 15, the server apparatus detecting means 1501 detects various server apparatuses connected to the network 100, and the item list storing means 403 stores metadata of the detected server apparatuses therein.

Figure 16:
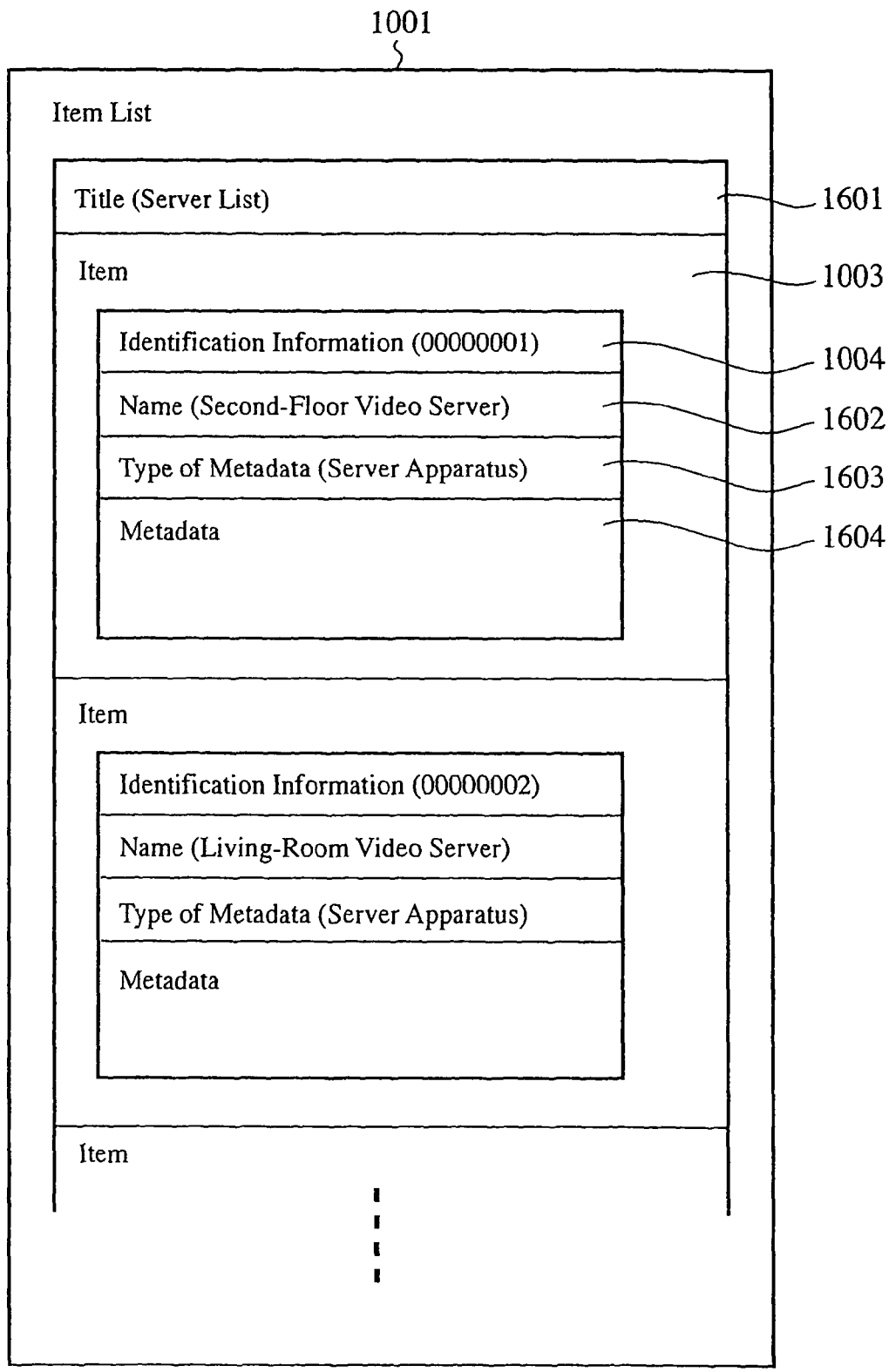
FIG. 16 shows the structure of an item list in a case in which an item list storing means 403 stores metadata of server apparatuses.

FIG. 16 shows the structure of an item list in a case in which the item list storing means 403 stores the metadata of the server apparatuses. Blocks each having the same functions as a corresponding block of the item list in accordance with Embodiment 1 are designated by the same reference numerals as shown in FIG. 10, and therefore the explanation of the blocks will be omitted hereafter.

In FIG. 16, a title 1601 indicates an example in which a character string indicating selection of a server apparatus is stored. Each name 1602 indicates an example in which a name extracted from the metadata of a corresponding server apparatus is stored. Each type 1603 of metadata indicates a server apparatus in order to show that the metadata of the server apparatus are contained in corresponding metadata 1604.

Figure 17:
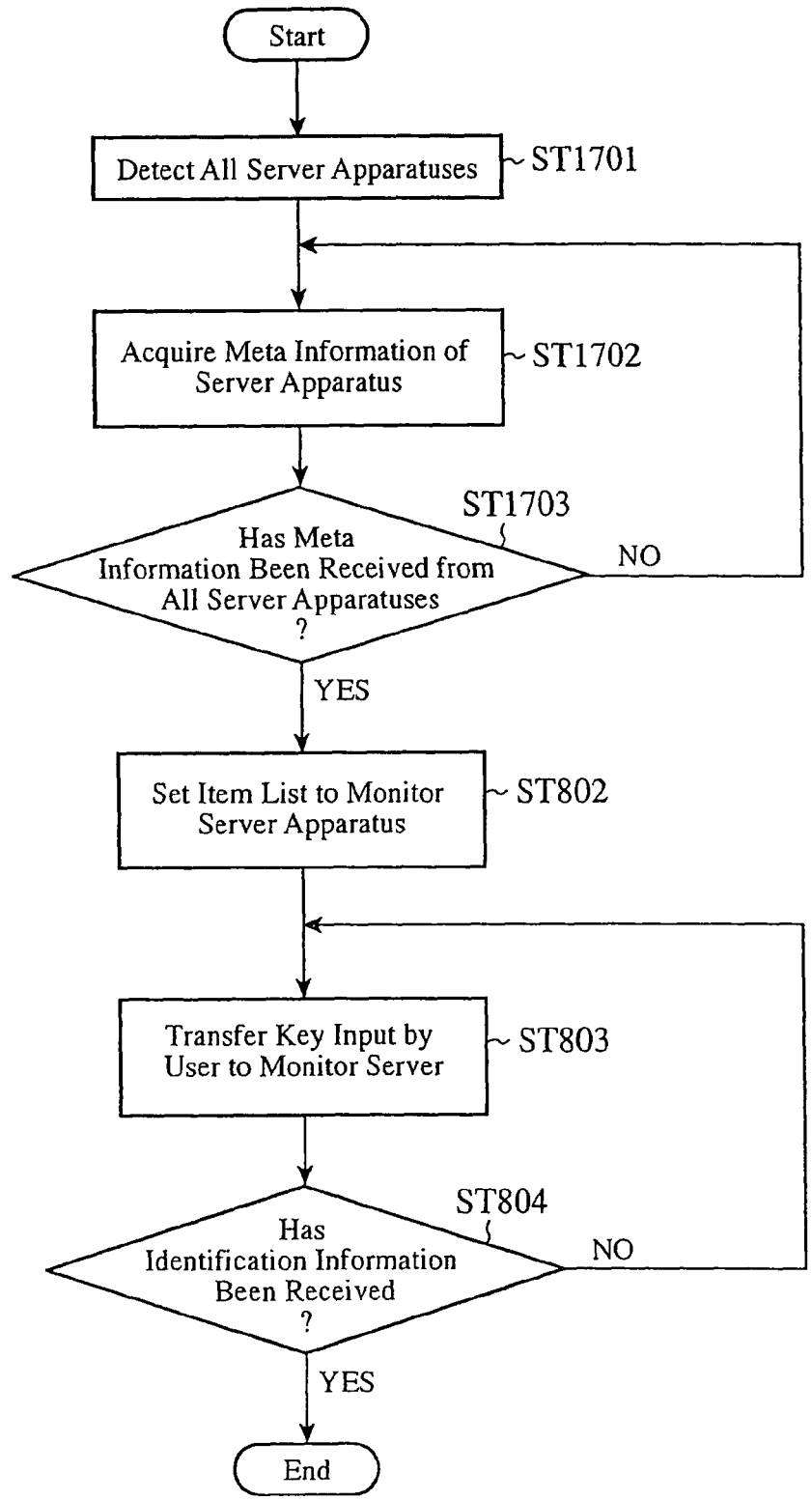
FIG. 17 is a flow chart showing a flow of a process carried out by the client apparatus of FIG. 15.

Next, a processing sequence will be explained. FIG. 17 is a flow chart showing a flow of a process carried out by the client apparatus of FIG. 15. Blocks each having the same functions as a corresponding block of the flow of the process carried out by a client apparatus in accordance with Embodiment 3 are designated by the same reference numerals as shown in FIG. 8, and therefore the explanation of the blocks will be omitted hereafter.

In step ST1701 of FIG. 17, the client apparatus detects server apparatuses connected to the network. For example, the client apparatus detects a server apparatus by broadcasting a packet which triggers the server apparatus to return an answer to the network, and then receiving the answer from the server apparatus, like in the case of UPnP.

In step ST1702, the client apparatus acquires metadata of each server apparatus detected in step ST1701.

In step ST1703, the client apparatus judges whether it has acquired metadata from all the server apparatuses detected in step ST1701. When the client apparatus has acquired metadata from all the server apparatuses detected, it advances to step ST803, or otherwise returns to step ST1702.

Figure 18:
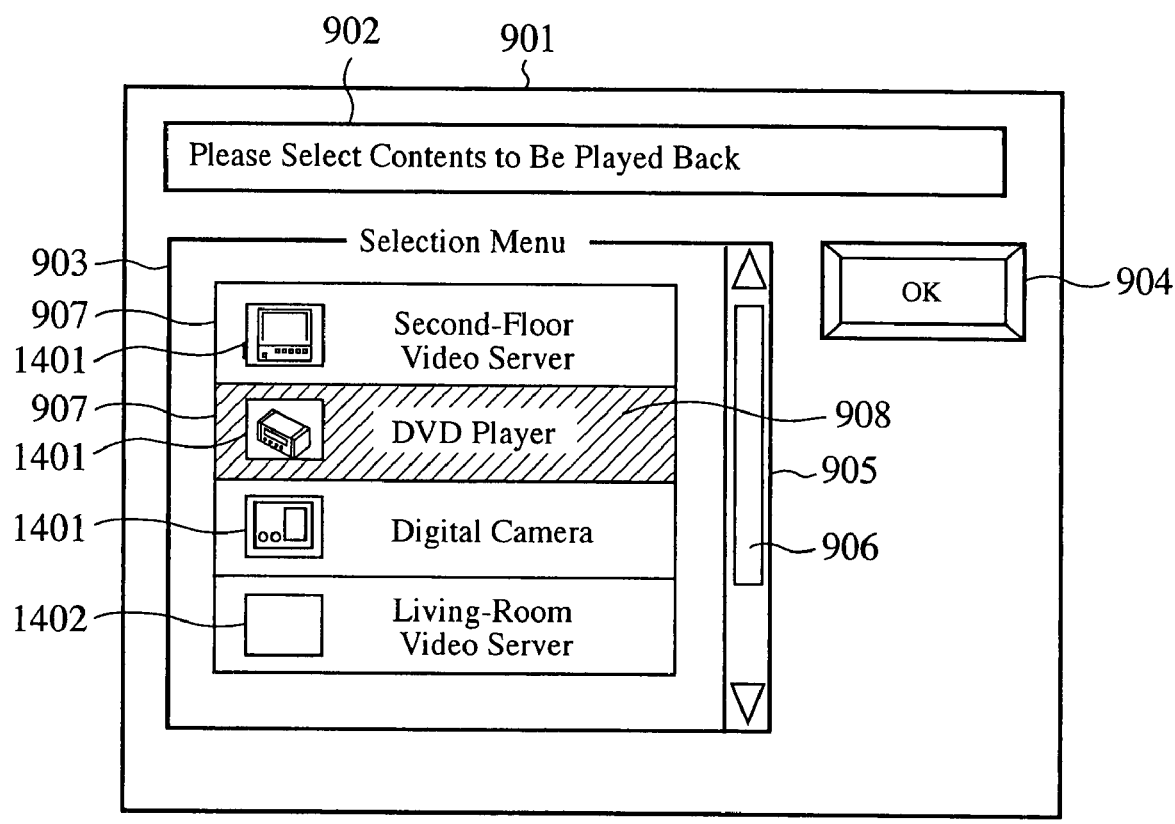
FIG. 18 is a diagram showing a UI presented by a monitor server apparatus 102 of Embodiment 4.

Next, a UI will be explained. FIG. 18 shows a UI presented by the monitor server apparatus 102 in accordance with Embodiment 4. Blocks each having the same functions as a corresponding block of the UI in accordance with Embodiment 3 are designated by the same reference numerals as shown in FIG. 14, and therefore the explanation of the blocks will be omitted hereafter. When a URI of an icon image is included in the metadata of a server apparatus contained in one metadata 1604, the additional information acquiring means 1301 of FIG. 13 acquires the icon image on the basis of the URI, and arranges it in a corresponding thumbnail area 1401. In this case, when the URI of the icon image is not included in the metadata 1604 or when the acquisition of the icon image ends in failure, no icon image is displayed (see a thumbnail area 1402 in the figure).

As mentioned above, the client apparatus in accordance with Embodiment 4 enables the user to select a detectable server apparatus connected to the network on the UI presented by the monitor server apparatus 102. Furthermore, when selecting contents, the user is allowed to select a media server apparatus 101 first, and then select the contents which the media server apparatus 101 manages.

INDUSTRIAL APPLICABILITY

As mentioned above, the client apparatus in accordance with the present invention makes it possible for a monitor server apparatus to present a convenient-to-use UI to the user through its application to a home network disposed in a private home or the like.

The invention claimed is:

1. A client apparatus comprising:
 a contents list request transmitting unit for transmitting a request of a media server apparatus to transmit a contents list which is a list of metadata of contents;
 a contents list receiving unit for receiving said contents list from said media server apparatus;
 an item list storing unit for storing said contents list and an item list having listed items each of which is described as metadata;
 an item list transmitting unit for transmitting said item list to a monitor server apparatus;
 a key input unit for receiving a key input;
 an input key transmitting unit for transmitting said key input to said monitor server apparatus; and
 an identification information receiving unit for receiving identification information making it possible to uniquely identify each of said items included in said item list,
 wherein said contents list request transmitting unit makes a request of said media server apparatus to transmit said contents list, said contents list receiving unit receives said contents list which said contents list request transmitting unit has made a request to transmit, and said item list storing unit stores said received contents list, so that said client apparatus acquires said contents list which said media server apparatus manages, and said item list transmitting unit transmits said item list which said item list storing unit stores to said monitor server apparatus, said input key transmitting unit transmits said key input inputted by said key input unit to said monitor server apparatus, and said identification information receiving unit receives identification information identifying an item selected on a user interface (UI) which said monitor server apparatus displays, so that said client apparatus identifies said selected item uniquely,
 wherein said client apparatus is communicatively connected to said media server apparatus and said monitor server apparatus through a network, and
 wherein said client apparatus, by operation of transmitting the item list to said monitor server apparatus, causes said monitor server apparatus to display at least part of the item list in the UI.

2. The client apparatus according to claim 1, wherein said item list transmitting unit transmits the item list to which a title of the UI which said monitor server apparatus displays is added to said monitor server apparatus.

3. The client apparatus according to claim 1, wherein said contents list request transmitting unit adds conditions under which said media server apparatus filters said contents list to the request to transmit said contents list, and transmits the request.

4. The client apparatus according to claim 1, further comprising:
 a personal information storing unit for storing personal information about a user of said client apparatus; and
 an item list handling unit for handling said item list on a basis of said personal information stored in said personal information storing unit.

5. The client apparatus according to claim 1, further comprising a server apparatus detecting unit for detecting a server apparatus on the network, wherein said client apparatus stores metadata of a server apparatus which said server apparatus detecting unit detects in said item list storing unit.

6. The client apparatus according to claim 1, wherein the input key is inputted by said key input unit and transmitted to said monitor server apparatus to navigate or make a selection from the item list as displayed in the UI.

7. A method implemented in a client apparatus comprising:
 transmitting a request via a network to a media server apparatus to transmit a contents list, the contents list being a list of metadata of contents;

receiving said contents list from said media server apparatus via said network;

storing said contents list and an item list having listed items each of which is described in metadata;

transmitting said item list via said network to a monitor server apparatus to be displayed by said monitor server apparatus in a user interface (UI);

receiving a key input from a user selecting an item displayed in the UI as part of the item list;

transmitting said key input to said monitor server apparatus via said network; and receiving identification information from the monitor server apparatus via said network, the received identification information uniquely identifying the selected item from each of the other items included in the item list.

8. The method according to claim 7, wherein the item list is transmitted to said monitor server apparatus to add a title to the UI displayed by said monitor server apparatus.

9. The method according to claim 7, further comprising:
adding conditions under which said media server apparatus filters said contents list to the request to transmit said contents list, prior to transmission of the request.

10. The method according to claim 7, further comprising:
storing personal information about a user of said client apparatus; and
handling the item list on the basis of the stored personal information.

11. The method according to claim 7, further comprising:
detecting a server apparatus on the network; and
storing metadata of the detected server apparatus.

12. The method according to claim 7, wherein the transmission of the item list to said monitor server apparatus causes said monitor server apparatus to display at least part of the item list in the UI.

13. The method according to claim 12, wherein a user of said client apparatus inputs the key input, which is transmitted to said monitor server apparatus, to navigate or make a selection from the item list as displayed in the UI.

* * * * *